United States Patent [19]
Craig et al.

[11] Patent Number: 6,154,294
[45] Date of Patent: Nov. 28, 2000

[54] APPARATUS FOR SCANNING DOCUMENTS SUCH AS PHOTOGRAPHS USING A CONTACT IMAGE SENSOR

[75] Inventors: Samuel F. Craig, Pittsburg; Benjamin P. Yung, Cupertino, both of Calif.

[73] Assignee: Silitek Corporation, Taipei, Taiwan

[21] Appl. No.: 09/118,693

[22] Filed: Jul. 16, 1998

[51] Int. Cl.$^7$ ................................................ H04N 1/04
[52] U.S. Cl. ........................................... 358/483; 358/474
[58] Field of Search ..................... 358/496, 483, 358/474, 471, 475, 482, 296; 250/208.1; 355/40, 27; 399/4, 130, 37, 117, 159; H04N 1/40, 1/04

[56] References Cited

U.S. PATENT DOCUMENTS

| | | | |
|---|---|---|---|
| 5,317,146 | 5/1994 | Isobe | 250/208.1 |
| 5,412,490 | 5/1995 | Kojima et al. | 358/473 |
| 5,463,256 | 10/1995 | Wang et al. | 271/274 |
| 5,475,211 | 12/1995 | Ogura et al. | 250/208.1 |
| 5,594,231 | 1/1997 | Pellicori et al. | 235/462 |

*Primary Examiner*—Cheukfan Lee
*Attorney, Agent, or Firm*—Townsend and Townsend and Crew LLP

[57] ABSTRACT

An apparatus for scanning a document, including scanning a photograph, the apparatus including a contact image sensor (CIS), the apparatus designed to reduce the friction between the contact image sensor and the document being scanned. The reduction is achieved by reducing the friction by use of a non-stick material or by reducing the static electricity forces or both. The preferred embodiment is a CIS whose housing is made of a non-stick material which also is static electricity dissipative.

20 Claims, 3 Drawing Sheets

APPARATUS FOR SCANNING DOCUMENTS SUCH AS PHOTOGRAPHS USING A CONTACT IMAGE SENSOR

BACKGROUND OF THE INVENTION

1. Field of the Invention

The invention relates to image scanning, and in particular the design and implementation of contact image sensors in scanning devices to allow for the scanning of photographic paper, specifically by reducing the sliding friction of the scanner window surface.

2. Description of the Problem and Prior Art

High-quality "scanning" of physical documents such as business documents into digital form is routinely accomplished in commercially available devices such as computer-attached document scanners and facsimile machines. Document scanners are used to convert images to digital form for inclusion in computer files. Facsimile machines transmit the digital information over telephone lines to other facsimile machines, which then recreate the original document. The conversion of the document from physical to digital form is accomplished in an image sensor unit. Traditionally, the image sensor is a charge coupled device (CCD) or a silicon image sensor. Illumination is provided by an illuminating device, while the optics for focusing from the surface of the document to the image sensor is provided with mirror(s) and lenses.

Recently, a compact integrated device, called a contact image sensor (CIS) has started to be used for the image sensor unit. A CIS typically incorporates illumination, focusing optics in the form of a narrow depth of focus lens array, and sensor arrays in one package. The narrow depth of focus lens array optics usually is a gradient index fiber optic array. The compact unit is often sealed, with illumination and document scanning occurring through a single "scanner window." Scanning devices are constructed so that the CIS image sensor unit scans the width of the document, which is placed at the focus of the unit, while the length of the document is scanned by inducing relative motion between the document and the sensor unit. The advantages of a CIS device over traditional sensor technology include: ease of manufacturing, reduced component count, fewer moving parts, reduced cost, integrated optics, and environmentally controlled optical path.

The relative motion between the document and the image sensor unit is obtained through one of two configurations. The first typically is used by "flat bed" scanners and copiers. In such a configuration, the CIS usually does not have a physical scanner window, and the document is placed on top of a sheet of transparent material, usually a glass platen, with an image scanner located below and focused through the transparent material. The CIS image scanner unit is forced to move the length of the document through a drive mechanism while the document remains stationary. This configuration is not the main area of application of the present invention.

A second configuration is suitable for use in facsimile machines, hand-held scanners and sheet-fed scanners, and is the main area of application of the present invention. In such a configuration, the CIS unit is arranged so that the focus of the sensor-lens system is coincident with the outer surface of a window that is fixed to the CIS. The document must be placed essentially in contact with the scanner window for the document to be in focus, and such a short (essentially zero) document-to-sensor window distance must be maintained while scanning. Because of the utility of this arrangement, sealed contact image sensors are common in facsimile machines and other inexpensive document scanners, and devices that use them must be configured so that the document to be scanned slides across the scanner window.

The contact image sensor arrangement has several advantages. Image sensor units are relatively durable and low cost, resulting in the near ubiquity of facsimile machines, and in the low cost of black and white or gray scale document scanners. Contact image sensors usually have a very small depth of focus however, on the order of two tenths of a millimeter, and so reliable scanning is accomplished only with a document in good contact with the scanner window. The relatively narrow depth of field of contact image sensors results in design problems that are not present in image sensors where the depth of field can be varied. The recent introduction of color contact image sensors provides yet another design problem: color scanners are used for photographs as well as printed documents, and thus the contact image sensor must be compatible with photographic media. Contact is not a problem with many types of common document material, such as smooth paper. However, scanners based on contact image sensors technology suffer from the inability to scan materials that cannot pass smoothly by the scanner unit. Specifically, photographic documents cannot reliably be used with contact image sensors. This inability manifests itself in the following ways:

1. Due to the soft, water absorbing properties of photographic emulsions, "wetted" contact between the photographic document and the scanner window may occur. When this happens, the coefficient of friction between the document and scanner window is increased, the document sticks to the scanner window, and document transport problems result.
2. The optical properties of the document/scanner window interface vary between wetted and non-wetted contact points. The partial sticking of the photographic document to the window results in streaks or spots on the scanned image which is denoted here as "spotting."
3. Soft photographic emulsions are much more susceptible to damage than are paper documents. Photographic documents may be harmed or scratched as a result of either the direct contact of the sliding contact with the window, or by dirt (or other) particles that may come between the document and the scanner window.

The inability to use this type of scanning technology on photographs is acknowledged by manufacturers of scanners, some of whom issue protective photograph covers of clear plastic for use when scanning photographs.

Thus there is a need in the art for overcoming the problems encountered with scanning by CISs of documents, such as photographs, that may stick to the scanner window.

OBJECTS OF THE INVENTION

The reason for the problems encountered with CIS scanning of photographs, as enumerated above, has to do with the interaction between soft photographic emulsions and the scanner window surface. In order to improve the utility of scanners by including the ability to handle photographs, in one aspect of the invention, a modification to the design of a traditional scanner window is proposed. Specifically, the modification includes reducing the amount of friction between the document and the outer surface of the scanner window, thus enabling contact image sensors to work for photographs with the same reliability and ease with which they work with paper and other document materials.

One object of the present invention is to allow CIS scanning to be useful in scanning documents that have the propensity to stick to the scanner window.

Another object of the invention is to reduce the incidence of document jamming that occurs during CIS scanning of photographic or similar documents.

Another object is to reduce the incidence of spotting that occurs during the CIS scanning of photographic or similar documents.

Another object is to reduce the incidence of scratching of documents that occurs during the CIS scanning of photographic or similar documents.

While some elements to reduce friction have been described herein, the adding of other friction reducing elements within the scope of the invention will become clear to those of ordinary skill in the art, and this invention is not limited to the specific methods and apparatuses described herein. In addition, while this invention is designed for the scanning of photographs, it is also generally useful in all scanning applications where sliding contact occurs, and thus where a reduction in sliding friction is advantageous.

SUMMARY OF THE INVENTION

According to one aspect of the present invention, the foregoing and other objects and advantages are attained by including modifications to a prior art scanner window to reduce friction with the document.

According to another aspect of the present invention, the foregoing and other objects and advantages are attained by including a scanner window which has a low coefficient of sliding friction with the document.

In accordance with yet another aspect of the invention, the scanner window is recessed in areas away from the focal area of the CIS unit to allow for the addition of non-slip material in those areas, while not interfering with the focus of the CIS optics.

In accordance with yet another aspect of the invention, the scanner window is recessed in areas away from the focal area of the CIS unit and includes non-slip material in those areas.

In accordance with yet another aspect of the invention, the scanner window is coated with a combination of light-transmitting and non-stick materials to allow for the smooth passage of the document over the CIS unit, and the transmission of the document image to the sensor array, the optics adapted to focus through the coating.

In accordance with yet another aspect of the invention, the non-focal area portion of the scanner window is coated with a layer of non-stick material that is less than the focal depth of the scanner optics.

BRIEF DESCRIPTION OF THE DRAWINGS

The present invention will be more fully understood from the detailed preferred embodiments of the invention, which, however, should not be taken to limit the invention to any specific embodiment but are for explanation and better understanding only. The embodiments in turn are explained with the aid of the following figures.

REFERENCE NUMERALS IN DRAWINGS

101 Contact Image Scanner (CIS)
103 Document
105 Scanner Window
107 Sensor Array Output
109 Output Electronics
111 CIS Output
113 Power Supply
221 Outer Housing or Cover
223 Light Source
225 Focusing Optics
227 Focal Area
229 Sensor Array
231 Substrate
233 Non-Focal Area
235 Focal Area Edge Rays
237 Scanner Window Outer Surface
239 Scanner Window Back Surface
401 Contact Image Scanner (CIS)
405 Scanner Window
423 Illumination Unit Housing
427 Focal Area
433 Non-Focal Area
441 Integral Housing
443 Housing Scanning Surface
445 Integral Housing Back Cover
447 Roller
449 Protruding Part of Integral Housing Unit
451 Flange
453 Flange
455 Drive Motor
600 a first alternative embodiment of a contact image sensor scanner window
605 Scanner Window
639 Scanner Window Back Surface
661 Non-Stick Material
700 a second alternative embodiment of a contact image sensor scanner window
705 Scanner Window
727 Focal Area
735 Focal Area Edge Rays
737 Scanner Window Outer Surface
739 Scanner Window Back Surface
771 Non-Stick Material 773 Light Transmitting Material 800 a third alternative embodiment of a contact image sensor scanner window 805 Scanner Window 827 Focal Area 835 Focal Area Edge Rays 839 Scanner Window Back Surface 881 Non-Stick Material 883 Scanner Window Recess

DETAILED DESCRIPTION OF THE PREFERRED EMBODIMENTS

Figure 1:
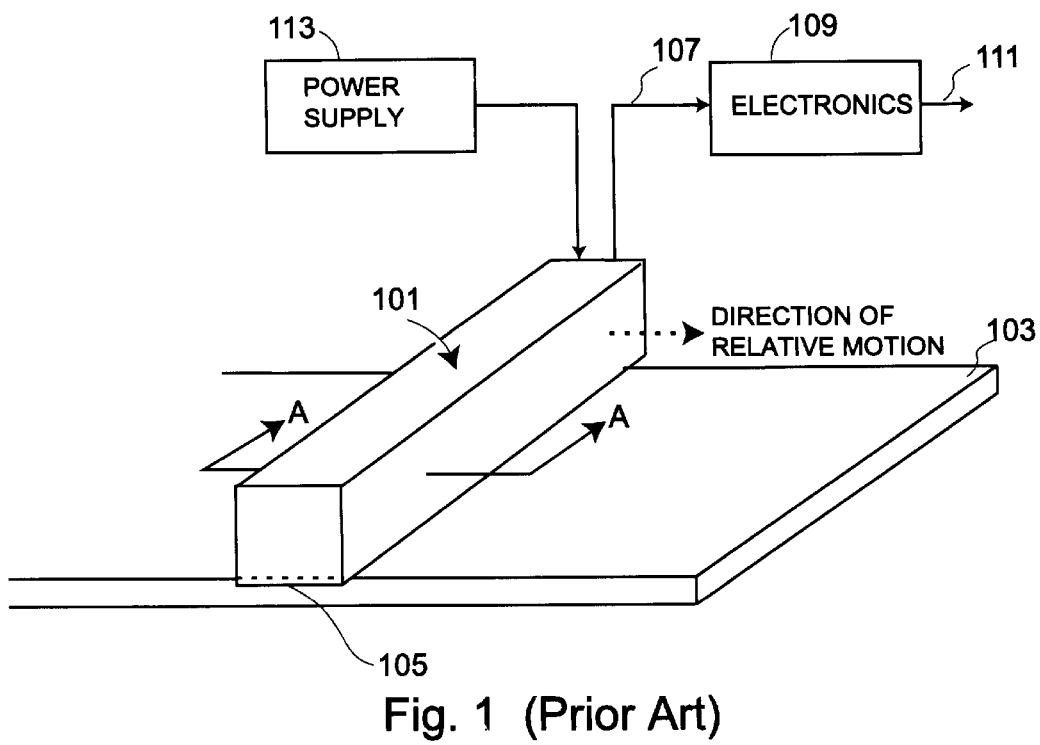
FIG. 1 is a perspective view of a contact image sensor traversing a document.

FIG. 1 shows a perspective view of a typical contact image sensor (CIS) 101 traversing a document. While a CIS such as CIS 101 shown in FIG. 1 is prior art, and hence is so labeled, a CIS with the friction reducing modifications described herein and a CIS with the reduced friction elements described herein are not prior art. CIS 101 is positioned for scanning a document 103 by placing the transparent scanner window 105 substantially in contact with document 103 and producing relative motion between CIS 101 and document 103. By scanner window 105 being substantially in contact with document 103 is meant that the distance between scanner window 105 and document 103 is very small so that the document remains in focus even given the narrow depth of field of the optics in CIS 101. Typical CIS 101 components are compact, and document 103 is scanned in a direction perpendicular to the CIS length direction. Relative motion may occur by either moving the CIS over a fixed document, or by moving the document over a fixed CIS. As would be clear to one in the art, necessary electrical connections for the operation of CIS 101 include a power supply 113, and electronics 109 which convert the CIS output 107 to a useful output 111. Elements 113 and 109 are standard as would be used in CIS scanners, including prior art CIS scanners and the CIS scanner of the invention.

Figure 2:
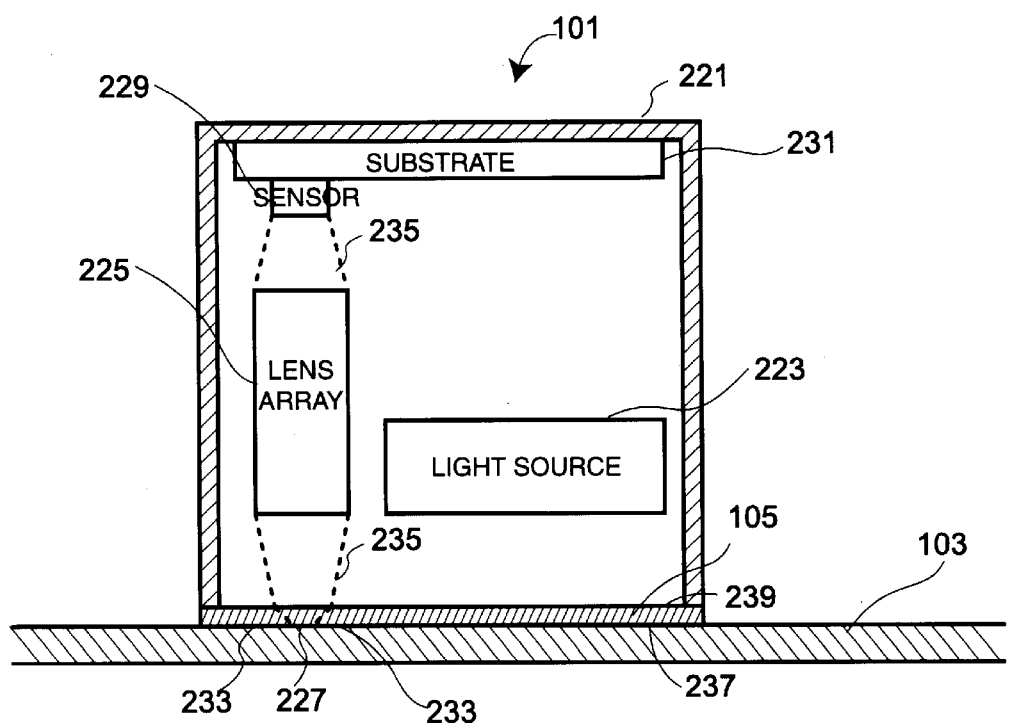
FIG. 2 is a schematic cross-sectional side view (section A—A of FIG. 1) of a contact image sensor as used in scanners and facsimile machines.

FIG. 2 shows a schematic cross-sectional side view of a typical CIS 101, which is shown as section A—A in FIG. 1. The size and placement of the components in cross sectional view are approximately the same at any location down the length of the CIS. Again, while FIG. 2 is labeled "prior art," a CIS with the friction reducing modifications described herein and a CIS with the reduced friction elements described herein are not prior art. CIS 101 is shown in FIG. 2 in the proper position for scanning document 103. The CIS components are contained within an outer housing or cover 221 and transparent scanner window 105. Scanner window 105 has an outer surface 237 facing document 103 during scanning, and a back surface 239 facing sensor array 229. The components that are important in scanning are a light source 223, focusing optics 225, and a sensor array 229. Scanner window 105, optics 225, sensor array 229 and light source 223 are all approximately the same length in a typical CIS. Sensor array 229 is part of a substrate 231 which contains electronics for controlling data flow from the output of sensor array 229, producing CIS output 107, shown in FIG. 1.

Light source 223 includes a light producing unit, such as an incandescent light or a set of light emitting diodes, with or without a light pipe, that produces light that is projected along the length of CIS 101 and towards scanner window 105. It is important that light source 223 illuminates at least part of document 103 with enough reflected light for sensor array 229 to produce a useful signal. Focusing optics 225, which can consist of a combination of lenses and mirrors or, as is typical in a CIS, a narrow depth of focus lens array such as a gradient index array (also called a self-focussing lens array, e.g., SELFOC Lens Array by Nippon Steel Glass Co., Tokyo, Japan), transfers the image of document 103, positioned against scanner window 105, onto sensor array 229. In a typical CIS scanner, focusing optics 225 have a very narrow depth of field, typically less than one millimeter, and focussing optics 225 are adapted to focus an area (called the focal area 227 herein) on the scanner window outer surface 237. For focused scanning, document 103 must be in contact with or close to being in contact with scanner window outer surface 237. Focal area 227 is typically approximately one millimeter wide and has a length determined by the design of focusing optics. The trace of the edge of focal area optical rays from focal area 227 to sensor array 229 are shown as focal area edge rays 235. The area of scanner window 105 that is not in focal area 227 is termed the non-focal area herein with reference numeral 233. Thus each point on scanner window outer surface 237 is in either focal area 227 or non-focal area 233.

The internal structure of some components, for example, components 231, 223, 229, and 225, are not shown for the sake of simplicity.

Figure 3:
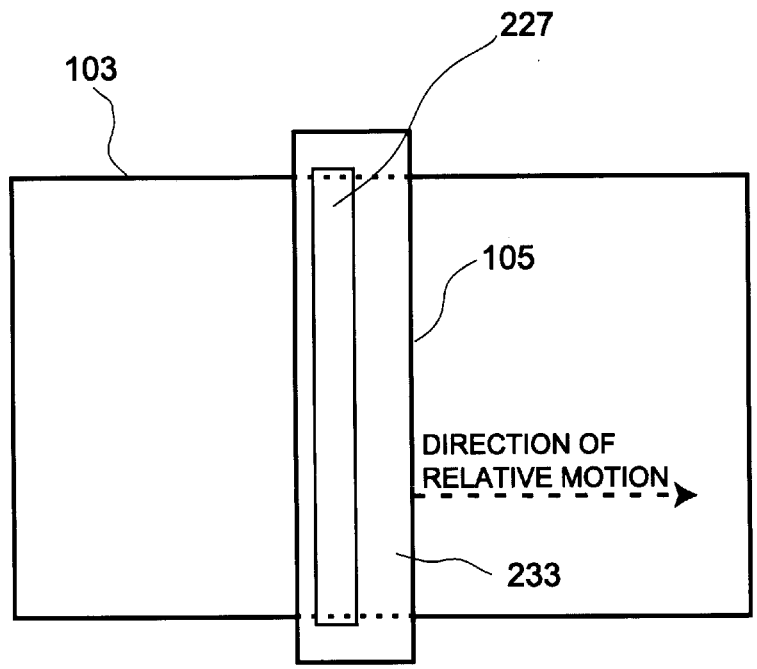
FIG. 3 is a top view of a contact image sensor on a document showing the outline of the scanner window, the focal-area and the non-focal area.

FIG. 3 shows a top view of document 103 with projections of scanner window 105, focal area 227 and non-focal area 233. The scanned area of document 103 is that area traced out by focal area 227 during the relative motion of the CIS and document 103.

The features of the present invention may be incorporated into several embodiments of CIS devices.

Figure 4:
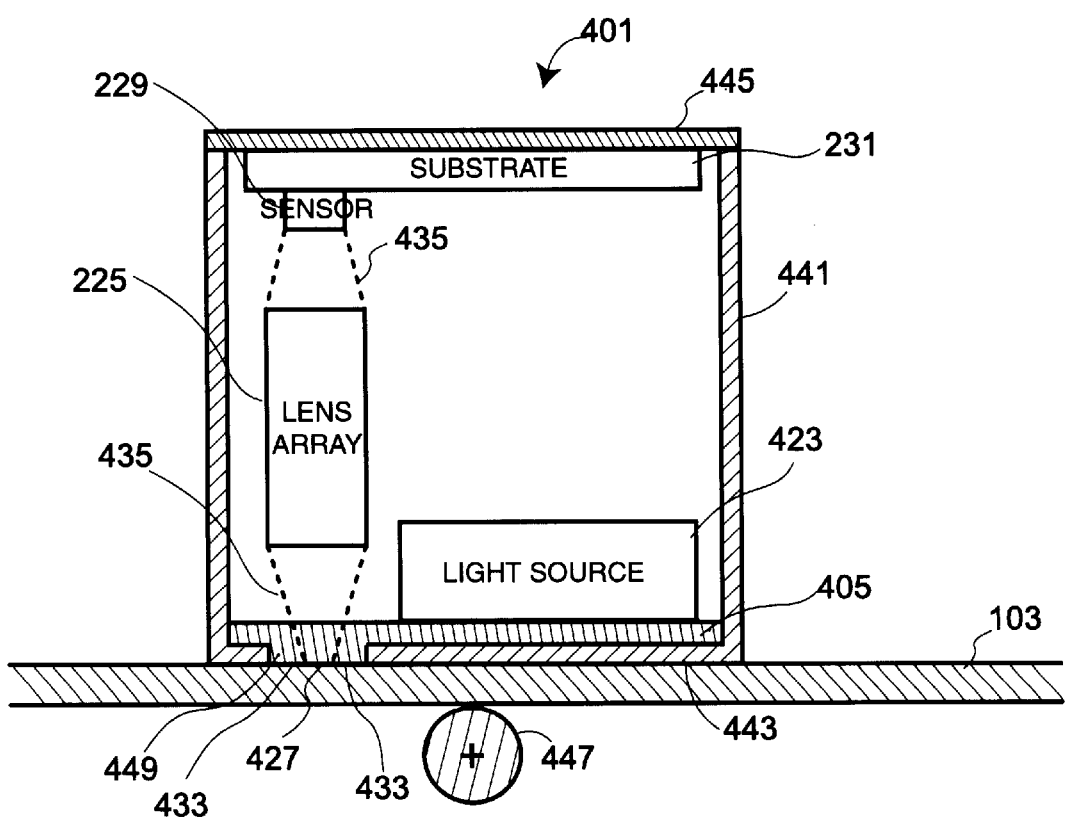
FIG. 4 is a schematic side view of the preferred embodiment of a contact image sensor with an integrated light source-scanner window, showing the features according to the present invention.

FIG. 4 is a schematic side view of one embodiment of a contact image sensor 401 which includes features according to the present invention. The CIS includes an integral housing 441 that includes a housing scanning surface 443 substantially in contact with document 103, up to but not including the focal area 427 leaving an opening in the front (i.e., document) side of integral housing unit 441. 433 is the non-focal area. Integral housing 441 is made of a combination of non-stick and static dissipative materials in a plastic binder base material. Any material that reduces the friction with the document during scanning will do for the non-stick material, and preferably, the non-stick material has a substantially lower coefficient of friction with the document than does the scanner window. Many non-stick materials may be used. For example, one can use one or more of a fluoropolymer (e.g., the polytetrafluorethylene TEFLON® from E.I. du Pont de Nemours and Company, Wilmington, Del.), silicone, ultra high molecular weight polyethylene (UHMW-PE) (Crown Plastics, Harrison, Ohio), and a polymer such as nylon. Static dissipative materials to use include adding carbon fibers or carbon powder. Many materials are suitable for use as the base material, including polycarbonate, nylon, and an acetal resin (e.g., DELRIN® from E.I. du Pont de Nemours and Company, Wilmington, Del.). Note nylon and the acetal resin already have a low coefficient of friction. Glass may also be added for mechanical strength. In the preferred embodiment, an available compound of polycarbonate with 30% carbon fiber, 13% TEFLON, and 2% silicone is used (Part Number J-50/CF/30/TF/13/SI/2 from Dutch State Mining of the Netherlands or DSM Engineering Plastics, Inc., Evansville Ind.). Integral housing 441 is formed with an integral housing back cover 445 as a separate piece to allow for easy mounting of the CIS components. Scanner window 405 is located interior to and against the front (document) side of integral housing unit 441, and thus has a protruding part 449 that fits in the opening of the front side of housing unit 441. A portion of protruding part 449, called the scanner window scanning surface herein, is flush with housing surface 443, contains the focal area 427 and non-focal area 433, and is arranged to allow sufficient lighting from an illumination unit 423 through focal area 427. Scanner window 405 is made of clear glass, or a scratch resistant, transparent material, such as acrylic or clear polycarbonate or a clear thermosetting monomer such as allyl diglycol carbonate (e.g., CR-39® from PPG Industries, Inc. of Pittsburgh, Pa.). In the preferred embodiment, clear acrylic is used because of the ease of co-molding the window material with the non-stick material compound. Integral housing unit 441 and scanner window 405 are preferably formed into a compact scanner design by co-molding scanner window 405 into integral housing 441.

Having the whole body made of a material which has a low coefficient of friction with document 103 solves one of the problems of prior art CIS devices when used, for example, for scanning photographs. Adding static electricity dissipative materials, such as carbon filled fibers, also reduces any sticking between the CIS and document 103 that may occur because of the attraction forces resulting from static electricity.

Figure 5:
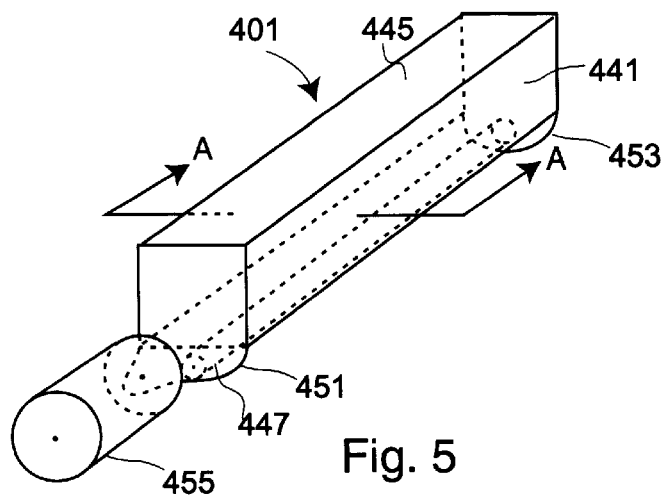
FIG. 5 is a perspective view of the preferred embodiment for an integral housing unit.

A perspective view of the preferred embodiment of integral housing unit 441 is shown in FIG. 5. FIG. 4 is the section A—A of FIG. 5. To simplify manufacture, each end of the CIS housing includes a flange, shown as flanges 451 and 453, respectively. These flanges are designed to include the mountings for roller 447. One flange, flange 451, also includes the mounting for a drive motor, the motor indicated by reference numeral 455.

To improve document illumination and to reduce manufacturing costs, scanner window 405 is integrated and optically coupled to illumination unit 423 and acts as a light pipe thereto, hence reducing the number of parts in the embodiment of CIS 401 while producing a mechanism with the same function. Document 103 is held against integral housing scanning surface 443 by a roller 447. Roller 447 is slightly offset from focal area 427, thus reducing the contact pressure between document 103 and scanner window 405 and resulting in decreased contact related imaging problems. Conventional prior-art implementation scanners using a CIS often include a roller for maintaining contact between the document and the scanner window, and typically such a roller may be positioned to impart a force on the document forcing the document against the focal area. The improvement in the embodiment of FIG. 4 includes positioning roller 447 to impart its force on the non-focal area rather than the focal area, thus reducing the likelihood of sticking problems in the focal area. Such an improvement may also be applied to the other embodiments disclosed herein.

The improvement in the embodiment of FIG. 4 of having scanner window 405 integrated and optically coupled to the light illumination unit 423, and acting as a light pipe thereto, may also be incorporated into any of the other embodiments described herein.

Alternate embodiments of the scanner window are now discussed. Each of these embodiments may be used to modify the design of a conventional CIS-based scanner such as that of FIGS. 1 and 2 or to design a new CIS-based scanner.

Figure 6:
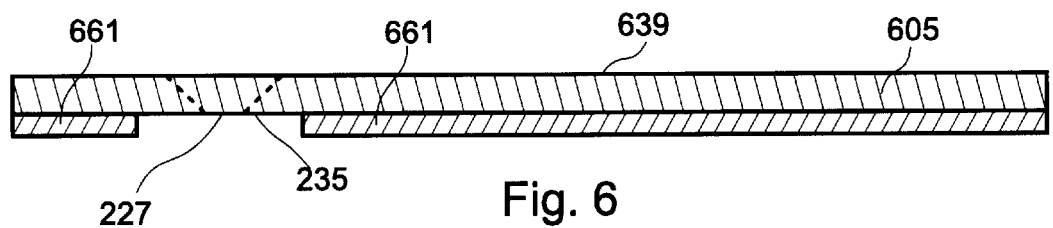
FIG. 6 is a schematic side view of the first alternative embodiment of a contact image sensor scanner window showing features according to the present invention.

FIG. 6 is a schematic side view of a first alternative embodiment 600 of a contact image sensor scanner window 605. A layer (an overlay) of non-stick material is attached to all or much of those portions of scanner window 605 opposite back surface 639 that are not in focal area 227. The non-stick layer material is thinner than the focal depth of the focal optics so that focussing is not substantially affected. Using a thin layer also should not substantially change the mechanical path thickness of the scanner. As shown in FIG. 6, focal area 227 is located on the non-coated portion of scanner window 605. Applying the non-stick layer as in the embodiment shown in FIG. 6 can be used to improve the performance of existing contact image sensors without adjusting the internal optics. Non-stick material 661 is chosen to have a relatively low coefficient of friction with document 103. Several materials may be used, for example, one or more of a fluoropolymer (e.g., the polytetrafluoroethylene TEFLON™), silicone, ultra high molecular weight polyethylene (UHMW-PE), and an acetal resin (e.g., DELRIN®). Static dissipative materials also may be advantageously added, and many such dissipative materials are available, including carbon fibers and carbon powder. Non-stick material 661 is attached to scanner window 105 either by a deposition technique or adhesively.

Figure 7:
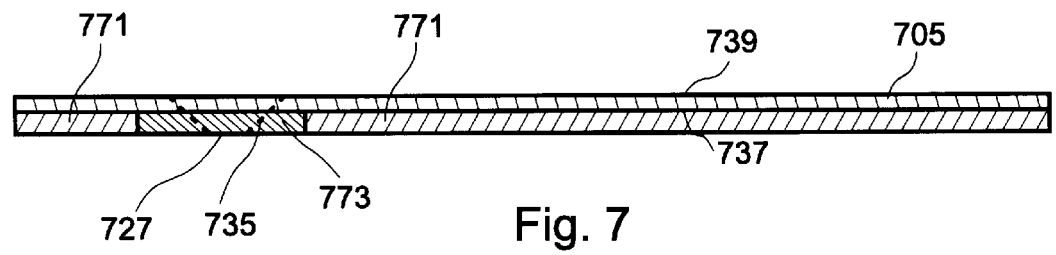
FIG. 7 is a schematic side view of the second alternative embodiment of a contact image sensor scanner window showing features according to the present invention.

FIG. 7 shows a schematic cross-sectional side view of a second alternative embodiment 700 of a scanner window 705, in which two layers of material have been applied to the side of scanner window 705 opposite back surface 739. One of the overlays is of the non-stick material, and the thickness of the non-stick material overlay may be greater than the focal depth of the focusing optics. A light transmitting material overlay 773 covers an area preferably greater than the focal area, shown as 727, and a non-stick material overlay 771 covers the remaining area of scanner window outer surface 737. The focal area edge rays are shown as 735. Light transmitting material 773 is a scratch resistant, transparent material, with appropriate materials including acrylic and CR-39®. Non-stick material 771 is chosen to have a low coefficient of friction with document 103, and appropriate materials include one or more of a fluoropolymer (e.g., the polytetrafluorethylene TEFLON®), silicone, ultra high molecular weight polyethylene (UHMW-PE), a nylon, and an acetal resin (e.g., DELRIN®). Static dissipative material such as carbon fibers or carbon powder also may be advantageously added. Both light transmitting material 773 and non-stick material 771 are preferably adhesively attached to scanner window 705, with optical properties chosen to minimize internal optical reflections during imaging. The thicknesses of light transmitting material 773 and non-stick material 771 are preferably substantially the same, presenting a smooth surface for scanning. As with the previously described embodiments, the CIS focusing optics are positioned to bring the scanner window focal area, shown as 727, into focus.

Figure 8:
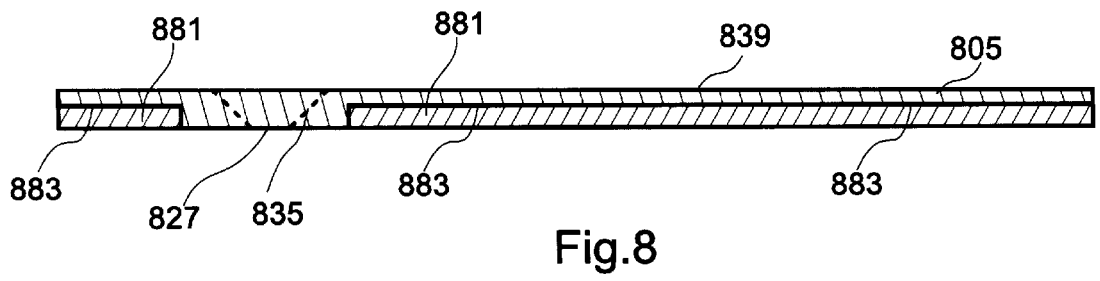
FIG. 8 is a schematic side view of the third alternative embodiment of a contact image sensor scanner window showing features according to the present invention.

FIG. 8 shows a schematic cross-sectional side view of a third alternative embodiment 800 of a scanner window 805. This embodiment also is the one incorporated in the preferred embodiment of a CIS device shown in FIG. 4. Scanner window 805 includes recessed area 883 on the side opposite back surface 839 allowing for the insertion of an overlay of non-stick material 881. The focal area edge rays are shown as 835. Non-stick material 881 is chosen to have a low coefficient of friction with document 103, and many materials are suitable, including one or more of a fluoropolymer (e.g., the polytetrafluoroethylene TEFLON®), ultra high molecular weight polyethylene (UHMW-PE), silicone, a nylon, and an acetal resin (e.g., DELRIN®). Static dissipative material such as carbon fibers or carbon powder also may be advantageously added. In the preferred embodiment of FIG. 4, the non-stick material 881 is part of integral housing 441 as described above. In other realizations, non-stick material 881 can be deposited on recess 883, attached using a layer of adhesive or double-stick tape, or otherwise adhesively attached. In addition, non-stick material 881 is deposited (if deposition is used) or fabricated (if the material is adhesively applied) so that it fits into scanner window recess 883 providing a surface flush with focal area 827. Scanner window recess 883 includes most of the area of scanner window 805, but does not include any of focal area 827, as this would interfere with document imaging. Focal area 827 is completely contained within that area not included in recess 883.

In another aspect of the invention, applicable to all embodiments described above, the edges of the materials in contact with document 103 are rounded (smoothed) in order to enhance the non-stick performance.

Hence, although this invention has been described with respect to preferred embodiments, those embodiments are illustrative only. No limitation with respect to the preferred embodiments is intended or should be inferred. It will be observed that numerous variations and modifications may be effected without departing from the true spirit and scope of the novel concept of the invention. For example, different materials may be used to produce low friction or the dissipation of static electricity or both, and the materials may be applied in different ways or be integral with the housing or parts thereof. It is intended that the scope of the invention be defined by the claims appended hereto.

What is claimed is:

1. An improvement to an apparatus for scanning a document, the apparatus comprising:
   (a) a contact image sensor (CIS) enclosed in a housing, the CIS comprising:
      (i) a light-sensitive sensor array, having an output,
      (ii) a scanner window substantially in contact with the document during scanning, said scanner window having an outer surface and a back surface, the back surface oriented towards the sensor array;
      (iii) an opening in said housing adapted to contain the scanner window,
      (iv) optics positioned between the scanner window and the sensor array, the optics adapted to focus a focal area of the outer surface onto the sensor array, the focusing being with a focal depth region, the focal area being that portion of the outer surface within the focal depth region, the balance of the outer surface being at least part of a non-focal area; and
      (iv) a light source adapted to illuminate at least part of the focal area;
   (b) electronics coupled to the sensor array output to convert the sensor array output to a useful signal, and
   (c) supply electronics coupled to the light source for controlling the light source,
   wherein the scanner window outer surface includes a portion of the focal area within the focal depth region, the improvement comprising:
      one or more alterations to the scanner window to reduce the friction between the scanner window and the document, said alterations comprising:
         (1) a recess of the scanner window, comprising a portion of the non-focal area, by a thickness greater than the focal depth of the optics,
         (2) a non-stick material, having a non-stick material outer surface facing the document, the non-stick material having approximately the thickness and area of said recess, the non-stick material selected to have a lower coefficient of friction with the document than does the scanner window material, and
         (3) means for attaching the non-stick material to the recess.

2. The improvement of claim 1 wherein the non-stick material is static electricity dissipative.

3. The improvement of claim 2 wherein said non-stick material is composed of a combination of materials, the combination including:
   (i) a fluoropolymer, silicone, ultra high molecular weight polyethylene, an acetate resin, or nylon, and
   (ii) carbon fibers or carbon powder.

4. The improvement of claim 1 wherein the non-stick material includes a fluoropolymer, silicone, ultra high molecular weight polyethylene, an acetate resin, or nylon.

5. The important of claim 1 wherein the edges of the elements substantially contacting the document during scanning are rounded.

6. An improvement to an apparatus for scanning a document, the apparatus comprising:
   (a) a contact image sensor (CIS) enclosed in a housing, the CIS comprising:
      (i) a light-sensitive sensor array, having an output,
      (ii) a scanner window substantially in contact with the document during scanning, said scanner window having an outer surface and a back surface, the back surface oriented towards the sensor array;
      (iii) an opening in said housing adapted to contain the scanner window,
      (iv) optics positioned between the scanner window and the sensor array, the optics adapted to focus a focal area of the outer surface onto the sensor array, the focusing being with a focal depth region, the focal area being that portion of the outer surface within the focal depth region, the balance of the outer surface being at least part of a non-focal area; and
      (iv) a light source adapted to illuminate at least part of the focal area;
   (b) electronics coupled to the sensor array output to convert the sensor array output to a useful signal, and
   (c) supply electronics coupled to the light source for controlling the light source,
   wherein the scanner window outer surface includes a portion of the focal area within the focal depth region, the improvement comprising:
      one or more alterations to the scanner window to reduce the friction between the scanner window and the document, said alterations comprising:
         (1) a non-stick material applied to at least part of the non-focal area, the non-stick material having approximately a thickness less than the focal depth of the optics, and
         (2) means of attaching the non-stick material to the scanner window, the non-stick material selected to have a lower coefficient of friction with the document than does the scanner window material.

7. The improvement of claim 6 wherein the non-stick material is static electricity dissipative.

8. The improvement of claim 7 wherein said non-stick material is composed of a combination of materials, the combination including:
   (i) a fluoropolymer, silicone, ultra high molecular weight polyethylene, an acetate resin, or nylon, and
   (ii) carbon fibers or carbon powder.

9. The improvement of claim 6 wherein the non-stick material includes a fluoropolymer, silicone, ultra high molecular weight polyethylene, an acetate resin, or nylon.

10. The improvement of claim 6 wherein the edges of elements substantially contacting the document during scanning are rounded.

11. A contact image sensor (CIS) device for use in an apparatus for scanning a document, the CIS enclosed in a housing, the CIS comprising:

(a) a light-sensitive sensor array;

(b) a scanner window substantially in contact with the document during scanning, said scanner window having an outer surface and a back surface, the back surface oriented towards the sensor array;

(c) a scanner window overlay attached to the scanner window, the overlay substantially contacting the document during scanning, and having a relatively low coefficient of friction with the document during scanning;

(d) an opening in said housing adapted to contain the scanner window;

(e) optics positioned between the scanner window and the sensor array, the optics adapted to focus a focal area of the outer surface onto the sensor array, the focusing being with a focal depth region, the focal area being that portion of the outer surface within the focal depth region, the balance of the outer surface being at least part of a non-focal area; and (f) a light source adapted to illuminate at least part of the focal area;

wherein the scanner window comprises a recess of the non-focal area, the scanner window overlay comprises a non-stick material, the overlay having a non-stick material outer surface facing the document, the non-stick material having approximately the thickness and area of said recess, said non-stick material attached to the recess, the non-stick material selected to have a lower coefficient of friction with the document than does the scanner window material.

12. The device of claim 11 wherein the non-stick material is static electricity dissipative.

13. The device of claim 12 wherein said non-stick material is composed of a combination of materials, the combination including:

(i) a fluoropolymer, silicone, ultra high molecular weight polyethylene, an acetate resin, or nylon, and (ii) carbon fibers or carbon powder.

14. The device of claim 11 wherein the non-stick material includes a fluoropolymer, silicone, ultra high molecular weight polyethylene, an acetate resin, or nylon.

15. The device of claim 11 wherein the edges of elements substantially contacting the document during scanning are rounded.

16. A contact image sensor (CIS) device for use in an apparatus for scanning a document, the CIS enclosed in a housing, the CIS comprising:

(a) a light-sensitive sensor array;

(b) a scanner window substantially in contact with the document during scanning, said scanner window having an outer surface and a back surface, the back surface oriented towards the sensor array;

(c) a scanner window overlay attached to the scanner window, the overlay substantially contacting the document during scanning, and having a relatively low coefficient of friction with the document during scanning;

(d) an opening in said housing adapted to contain the scanner window;

(e) optics positioned between the scanner window and the sensor array, the optics adapted to focus a focal area of the outer surface onto the sensor array, the focusing being with a focal depth region, the focal area being that portion of the outer surface within the focal depth region, the balance of the outer surface being at least part of a non-focal area; and (f) a light source adapted to illuminate at least part of the focal area;

wherein the scanner window overlay comprises a non-stick material applied to at least part of the non-focal area, the non-stick material overlay having a thickness approximately less than the focal depth of the optics, the non-stick material selected to have a lower coefficient of friction with the document than does the scanner window material.

17. The device of claim 16 wherein the non-stick material is static electricity dissipative.

18. The device of claim 17 wherein said non-stick material is composed of a combination of materials, the combination including:

(i) a fluoropolymer, silicone, ultra high molecular weight polyethylene, an acetate resin, or nylon, and (ii) carbon fibers or carbon powder.

19. The device of claim 16 wherein the non-stick material includes a fluoropolymer, silicone, ultra high molecular weight polyethylene, an acetate resin, or nylon.

20. The device of claim 16 wherein the edges of elements substantially contacting the document during scanning are rounded.

\* \* \* \* \*